(12) United States Patent
Woodruff et al.

(10) Patent No.: US 10,455,325 B2
(45) Date of Patent: Oct. 22, 2019

(54) DIRECTION OF ARRIVAL ESTIMATION FOR MULTIPLE AUDIO CONTENT STREAMS

(71) Applicant: Knowles Electronics, LLC, Itasca, IL (US)

(72) Inventors: John Woodruff, Mountain View, CA (US); Pratik Shah, Mountain View, CA (US); Sai Ravi Teja Pulugurtha, Mountain View, CA (US); Harsha Rao, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/234,509

(22) Filed: Dec. 27, 2018

(65) Prior Publication Data

US 2019/0208317 A1    Jul. 4, 2019

Related U.S. Application Data

(60) Provisional application No. 62/611,222, filed on Dec. 28, 2017.

(51) Int. Cl.
| | |
|---|---|
| *H04R 3/00* | (2006.01) |
| *H04R 1/40* | (2006.01) |
| *G06N 3/08* | (2006.01) |
| *G10L 21/0272* | (2013.01) |
| *H04R 3/04* | (2006.01) |

(52) U.S. Cl.
CPC .............. *H04R 3/005* (2013.01); *G06N 3/08* (2013.01); *G10L 21/0272* (2013.01); *H04R 1/406* (2013.01); *H04R 3/04* (2013.01)

(58) Field of Classification Search
CPC .......... H04R 3/005; H04R 1/406; H04R 3/04; G10L 21/0272; G06N 3/08
USPC .......................................................... 381/92
See application file for complete search history.

(56) References Cited

U.S. PATENT DOCUMENTS

| | | |
|---|---|---|
| 7,319,959 B1 | 1/2008 | Watts |
| 8,143,620 B1 | 3/2012 | Malinowski et al. |
| 8,194,880 B2 | 6/2012 | Avendano |
| 8,447,596 B2 | 5/2013 | Avendano et al. |
| 8,611,552 B1 | 12/2013 | Murgia et al. |

(Continued)

OTHER PUBLICATIONS

International Search Report and Written Opinion, PCT/US2018/067762, Knowles Electronics, LLC (dated Mar. 19, 2019).

(Continued)

*Primary Examiner* — Paul Kim
(74) *Attorney, Agent, or Firm* — Foley & Lardner LLP

(57) ABSTRACT

A method for estimating directions of arrival of audio signals based on categories is disclosed herein. The method includes receiving an audio signal; generating a plurality of filters based on the audio signal, each of the filters corresponding to one of a plurality of sound content categories; separating the audio signal into a plurality of content-based audio signals by applying the filters to the audio signal, each of the content-based audio signals contains a content of a corresponding sound content category among the plurality of sound content categories; for each of the content-based audio signals, generating a direction of arrival (DOA) for a sound source of the content-based audio signal.

20 Claims, 8 Drawing Sheets

(56) References Cited

U.S. PATENT DOCUMENTS

| | | |
|---|---|---|
| 8,934,641 B2 | 1/2015 | Avendano et al. |
| 9,008,329 B1 | 4/2015 | Mandel et al. |
| 9,210,503 B2 | 12/2015 | Avendano et al. |
| 9,431,023 B2 | 8/2016 | Avendano et al. |
| 9,500,739 B2 | 11/2016 | Woodruff et al. |
| 9,536,540 B2 | 1/2017 | Avendano et al. |
| 9,799,330 B2 | 10/2017 | Nemala et al. |
| 9,838,784 B2 | 12/2017 | Vallabhan et al. |
| 9,978,388 B2 | 5/2018 | Avendano et al. |
| 2007/0083365 A1 | 4/2007 | Shmunk |
| 2017/0208415 A1* | 7/2017 | Ojala .................. A63F 13/54 |

OTHER PUBLICATIONS

Qian et al., "3D audio-visual speaker tracking with an adaptive particle filter," 2017 IEEE Int'l Conf. on Acoustics, Speech and Signal Processing, pp. 2896-2900 (Mar. 5, 2017).

Uhlich et al., "Improving music source separation based on deep neural networks through data augmentation and network blending," 2017 IEEE Int'l Conf. on Acoustics, Speech and Signal Processing, pp. 261-265 (Mar. 5, 2017).

* cited by examiner

DIRECTION OF ARRIVAL ESTIMATION FOR MULTIPLE AUDIO CONTENT STREAMS

CROSS-REFERENCE TO RELATED APPLICATIONS

The present application claims priority to U.S. Provisional Patent Application No. 62/611,222 filed Dec. 28, 2017, the contents of which are incorporated herein by reference in their entirety.

TECHNICAL FIELD

The present embodiments relate generally to audio processing and more particularly to direction of arrival estimation of audio streams.

BACKGROUND

There is considerable market interest in technology for analyzing captured audio signals (e.g., from a microphone array) and determining the direction of arrival (DOA) of one or more sound sources being captured in the audio signals. Existing techniques for estimating DOA do not perform well in complex acoustic scenes where there are multiple sound sources, especially when the sounds sources come and go, or move relative to the capturing device. Overcoming these and other challenges thus remains desirable.

BRIEF DESCRIPTION OF THE DRAWINGS

For a more complete understanding of the disclosure, reference should be made to the following detailed description and accompanying drawings wherein.

DETAILED DESCRIPTION

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

According to certain general aspects, the present embodiments are directed to an audio processing technology that is capable of accurately estimating the direction of arrival (DOA) of sound sources in an audio signal. In embodiments, the audio processing technology operates in conjunction with an audio separation technology that is capable of separating an audio signal captured by one or more acoustic sensors into one or more sound signals (also referred to as audio signals or audio streams if continuously fed) of specific sound categories. In these and other embodiments, the directions of arrival are estimated for sound sources corresponding to the specific sound categories (also referred to as content classes) such as speech, music or ambient sound. According to certain aspects, by coupling these technologies, the present embodiments are able to identify the DOA information associated with each content-based stream and mitigate the corrupting influence of other sources on the DOA estimates. This enables high-quality multiple DOA estimation, where the type of audio content that is associated with each estimated DOA is also known. This DOA information can be used to, e.g., reproduce the captured sound environment for VR or AR applications.

Figure 1:
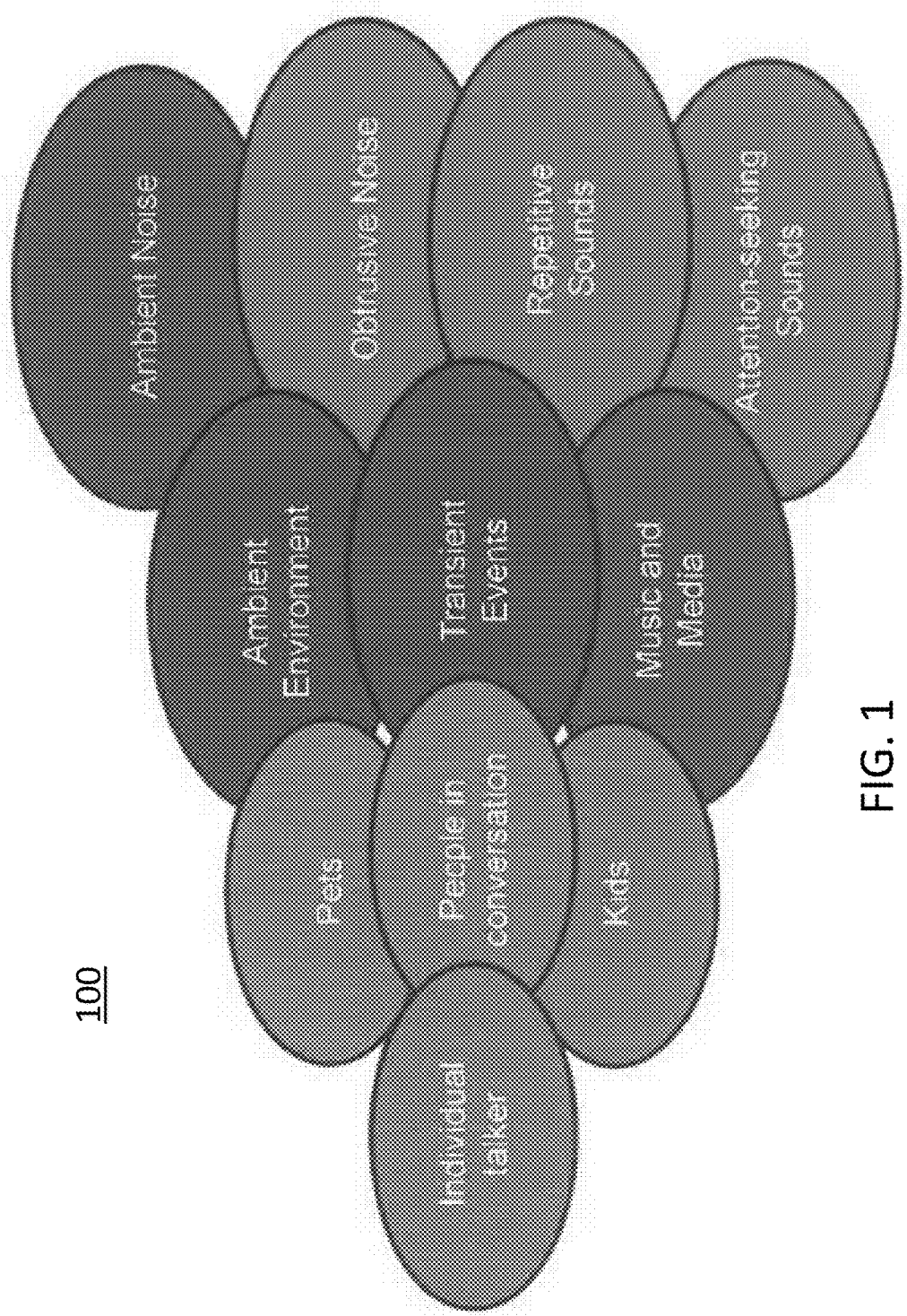
FIG. 1 illustrates examples of sound sources corresponding to various sound content categories, according to an exemplary embodiment.

To illustrate certain aspects of the present embodiments, FIG. 1 provides examples of possible sound content categories that can exist in an environment 100 (also referred to as sound environment or sound stage) in which the disclosed audio separation can be applied, for example a home environment. As shown, the environment 100 may include at least one individual talker who is speaking. The environment 100 may include other humans or animals making sounds, such as other people in conversation, kids playing, laughing or crying, or pets making sounds. In addition, the environment 100 may include music and/or sound media (e.g., sound track of a film), transient event sounds (e.g., sounds from humans in the environment handling metal objects or aluminum cans, chopping food, dropping a plate or glass, etc.), and/or ambient environment sounds. As shown, the ambient environment sounds can include sounds which can be further broken down into different specific categories such as ambient or background noise (e.g., machine buzzing or humming, air conditioner sound, washing machine swirling, etc.), repetitive sounds (e.g., hammering, construction sound, ball bouncing, etc.), obtrusive noise (e.g., vacuum, coffee grinder, food processor, garbage disposal, drill, etc.), or attention-seeking sounds (e.g., ringers, horns, alarms, sirens, etc.). It should be apparent that many of these categories including the ambient environment sound categories can be further broken down or consolidated in various ways.

According to some embodiments of the present disclosure to be described in more detail below, the present embodiments utilize deep learning to separately identify sound signals associated with specific content categories. Deep learning refers to a learning architecture that uses one or more deep neural networks (NNs), each of which contains more than one hidden layer. The deep neural networks may be, e.g., feed-forward neural networks, recurrent neural networks, convolutional neural networks, etc. In some embodiments, data driven models or supervised machine learning models other than neural networks may be used for audio separation as well. For example, a Gaussian mixture model, hidden Markov model, or support vector machine may be used in some embodiments.

In particular, in some embodiments, the disclosed audio processing technology uses deep neural networks to estimate filters (i.e. time-frequency masks) for filtering the sound signal(s). A time-frequency mask is a real-valued or complex-valued function (also referred to as masking function) of frequency for each time frame, where each frequency bin has a magnitude between 0 and 1. The masking function is multiplied by a complex, frequency-domain representation of an audio signal to attenuate a portion of the audio signal at those time-frequency points where the value of the masking function is less than 1. For example, a value of zero of the masking function mutes a portion of the audio signal at a corresponding time-frequency point. In other words, sound in any time-frequency point where the masking function is equal to 0 is inaudible in a reconstructed output signal filtered by the masking function.

In some embodiments, at least one time-domain audio signal captured from one or more acoustic sensors (e.g., microphones) is transformed into a frequency domain or a time-frequency domain (using, e.g., fast Fourier transform (FFT), short-time Fourier transform (STFT), an auditory filterbank and/or any other type of suitable transform). Feature extraction is performed on the frequency domain representation of the audio signal and the extracted features are used as inputs to at least one deep neural network. The neural network may run in a real time as the audio signal is captured and received. The neural network receives a new set of features for each new time frame and generates one or more filters (i.e. time-frequency masks) for that time frame. Each filter corresponds to a pre-defined sound content category. The frequency-domain audio signal(s) are multiplied by the masking functions of the filters and resynthesized into the time domain to produce multiple output signals. Each output signal is an audio signal of a corresponding audio content category.

Concurrently with separating the audio signal into sound-category specific audio signals, the present embodiments estimate the probability of DOA per time-frequency point. In other words, the present embodiments estimate the probability that the dominant sound energy originated from a source in a particular direction for each sound category. Given the DOA probabilities per time-frequency point, and the filters for each specific sound content, embodiments can integrate the DOA information for each stream of audio content independently, which mitigates the corrupting influence of the other sound sources and room reverberation. Especially advantageous is that the DOA information from each content stream can be tracked across time independently, meaning that the present embodiments can avoid commonly used and complex procedures for properly associating new DOA estimates with previously tracked sources, such as multiple-hypothesis tracking.

Figure 2:
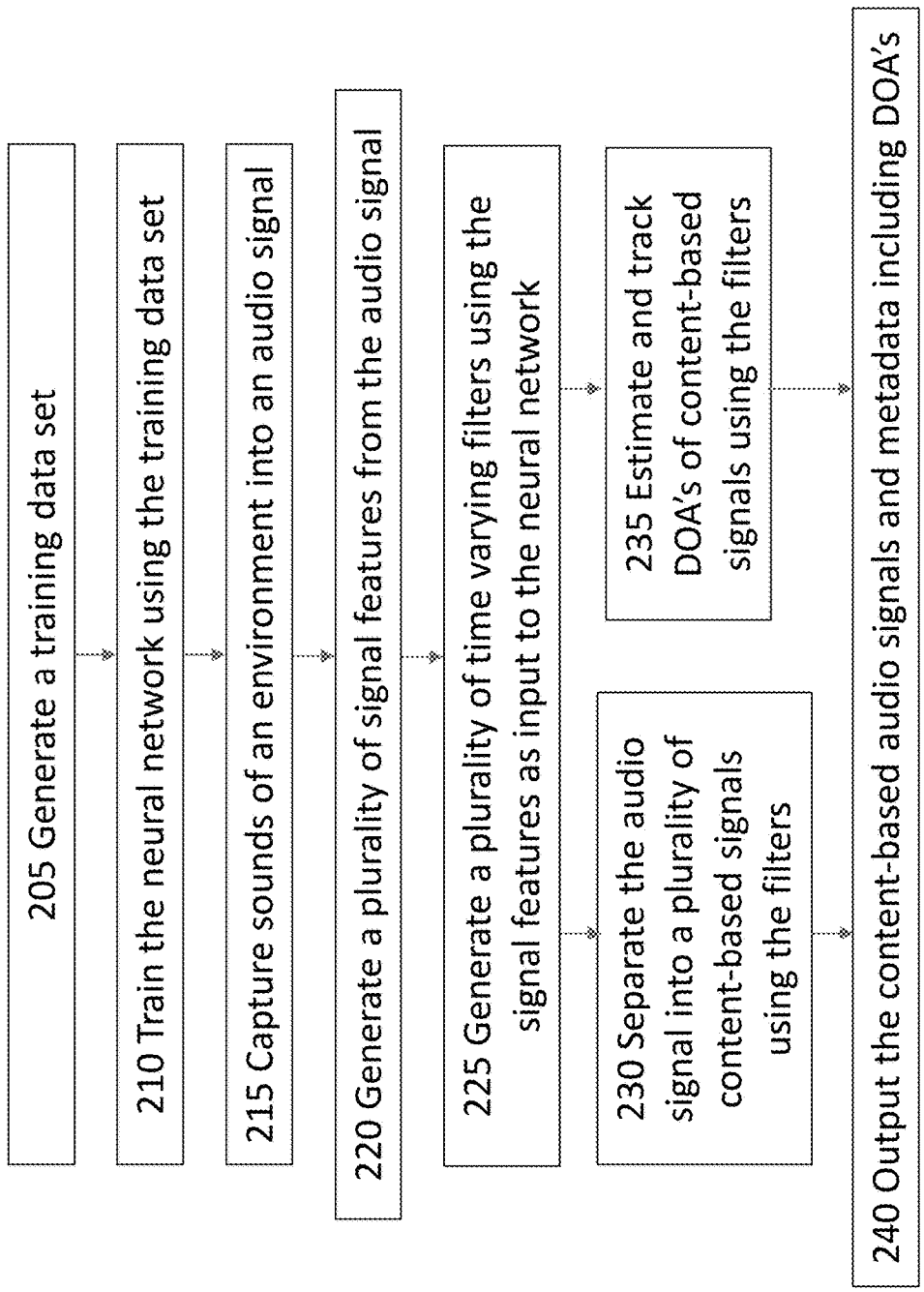
FIG. 2 illustrates a flow chart of an example method of estimating directions of arrival of audio signals of sound sources based on categories, according to an exemplary embodiment.

FIG. 2 illustrates a flow chart of an example method of processing audio signals to estimate directions of arrival according to the present embodiments. At step 205, a training data set is generated, for example by combining a first audio signal of a first known sound content category and a second audio signal of a second known sound content category into a training audio signal. The training data set is used to train a neural network of the audio processing system. It should be apparent that there can be more than two audio signals and corresponding known sound content categories used for training, depending on the number of sound content categories that are required in a particular application.

At step 210, the system trains the neural network by feeding the training audio signal into the neural network and optimizing parameters of the neural network. The goal of the training of the neural network is that a trained version of the neural network can be used to separate the training audio signal (in this simplified example) into an instance of the first audio signal and an instance of the second audio signal. Those instances are the same as, or close to, the original first and second audio signals. Once the neural network is trained, the audio processing system can perform direction of arrival estimation. It should be noted that, although shown here along with other processing for ease of illustration, step 210 can actually be performed in an off-line process that is separate from the remaining "on-line" processing performed as described below.

Having the trained neural network, at step 215, one or more microphones (e.g., a microphone array) capture sounds of an environment into an audio signal. The audio signal includes a combination of content-based audio signals. In some embodiments, the one or more microphones are part of the audio processing system. In some other embodiments, the one or more microphones are external components or devices separate from the audio processing system.

At step 220, a feature extraction module of the audio processing system generates a plurality of features from the audio signal. Examples of features that can be extracted from the audio signal, as well as examples of how feature extraction can be done, are described in more detail below.

At step 225, the neural network of the audio processing system generates a plurality of time-varying filters in a frequency domain using the signal features as inputs to the neural network. Each of the time-varying filters corresponds to one of a plurality of sound content categories. In some embodiments, each of the time-varying filters is a time-varying real-valued function of frequency. A value of the real-valued function for a corresponding frequency represents a level of attenuation for the corresponding frequency.

At step 230, the audio processing system separates the audio signal into a plurality of content-based (i.e., category specific) audio signals by applying the time-varying filters to the audio signal. Each of the content-based (i.e. category specific) audio signals contains content of a corresponding sound content category among the plurality of sound content categories for which the system has been trained. In some embodiments, the content-based audio signals are produced by multiplying the audio signal by the time-varying real-valued functions.

Concurrently with step 230, at step 235, the audio processing system estimates and/or tracks directions of arrival for one or more sound sources corresponding to each of the sound content categories. This step is also performed using the time-varying filters for each of the sound content categories as will be described in more detail below.

In step 240, the audio processing system outputs the content-based audio signals together with metadata for the content-based audio signals which includes the estimated DOA's for the content-based audio signals.

Figure 3:
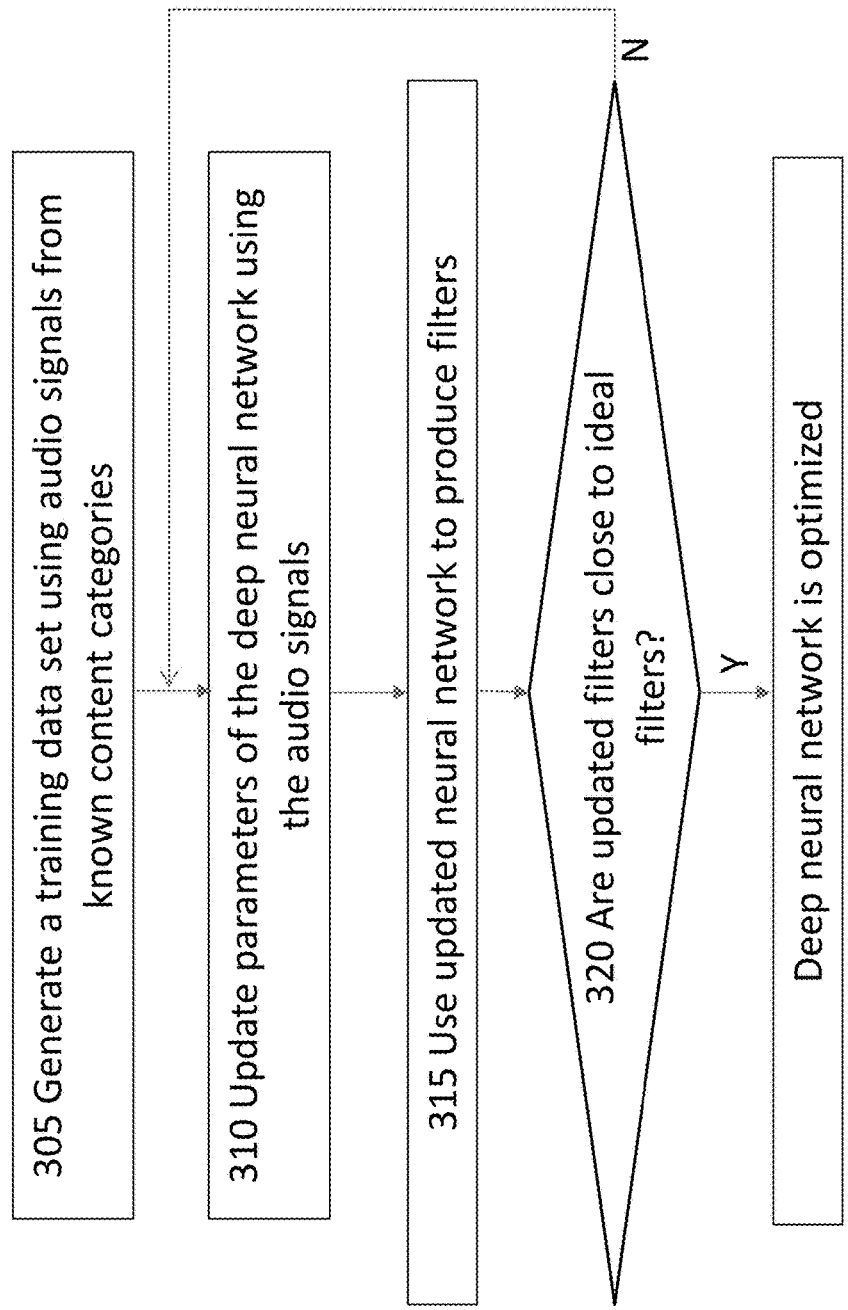
FIG. 3 illustrates a flow chart of an example method of training a neural network for separating audio signals based on categories, according to an exemplary embodiment.

FIG. 3 is a flowchart further illustrating an example method of training a deep neural network of an audio processing system, according to some embodiments of the present disclosure. As set forth above, the training process starts in step 305 by generating a training data set including audio signals with known content categories. For example, speech, music and transient event sound content could be drawn from a large audio database. Audio content in this database is preferably captured with one (mono) or two (stereo) high-quality microphones at close range in a controlled recording environment. The audio signals in this database are preferably tagged with known content categories or descriptive attributes, e.g., "dog barking" or "dishwasher sound". Each audio content signal drawn from the database is convolved with a multi-microphone room impulse response (RIR) that characterizes acoustic propagation from a sound source position to the device microphones. After convolution with device RIRs, the multi-microphone audio signals for each content category, known as the "clean" signals, are mixed at different signal levels to create a multi-microphone audio mixture. In order for the pre-trained model to generalize to unseen acoustic data, it is important to generate a multitude of audio mixtures with many instances of sound events corresponding to each content category, e.g. many speech utterances, music recordings and different transient events. Further, it is desirable to use RIRs for many sound source positions, device positions and acoustic environments and to mix content categories at different sound levels. In some embodiments, this process may result in tens, hundreds or even thousands of hours of audio data.

In step 310, a model coefficient update process is performed to update parameters of the deep neural network until the deep neural network is optimized to make predictions consistent with the known content categories. As shown in this example, the update process can be performed iteratively from random coefficient initialization and in step 315 the updated deep neural network is used to produce separated audio signals. For example, and as will be described in more detail below, the training data containing signals with the known sound categories can be fed to a feature extraction module to generate signal features in the frequency domain. The deep neural network that is being trained receives the signal features and generates a set of frequency masks that filter the audio signals to generate separated audio signals corresponding to the known sound content categories, which may include the known target signal and the known interference signal.

In step 320 the filters (i.e. frequency masks) that are generated by the deep neural network to separate content streams are compared to the optimal frequency filters, or "labels". Optimal filters are available in training because audio mixtures are created from mixing the clean content signals, making it possible to compute the filter that perfectly reconstructs the magnitude (and in come embodiments, magnitude and phase) spectrum of the desired signal for a given content category in a process called label extraction. As shown, the model coefficient update process in step 310 can be repeated iteratively, for example using a gradient descent approach, until the frequency masks produced by the deep neural network are very close to the optimal masks, at which point the deep neural network is optimized. In some embodiments, rather than, or in addition to, comparing the generated filters to optimal filters, the magnitude spectra or complex spectra of the separated content signals can be estimated directly by the deep neural networks. In this case, the spectra produced by the deep neural network can be compared to the clean signal spectra during optimization.

It should be noted that the training process performed as illustrated in the example method described in connection with FIG. 3 is an offline process. Offline training of the deep neural network must be performed for an initial audio separation configuration. However, in some embodiments, the deep neural network coefficients can be updated online to further optimize performance for the acoustics and environment of a given device. In this case the network is not able to learn new content categories, but is able complement the initial training data with new data collected live on the device. Because updating the neural network coefficients requires definition of the optimal filter (i.e. frequency mask), or equivalently the clean signal spectra, any newly collected data live on device must largely contain only one content category. Time segments of live audio that contain only one of the pre-defined content categories can be found by comparing the estimated content signals to the input audio mixture. When an estimated content signal is very close to the audio mixture, it can be assumed that no other audio content is present. Alternatively, when the frequency mask corresponding to all but one of the content categories has a magnitude close to 0 for all frequencies, the audio content may be assumed to belong to a single category. This data can be captured and added to the content used during model training. Model coefficients could then be updated and then downloaded to update the coefficients being used by the online system. This process would not be expected to occur in real-time and training may not be performed directly on device. However, this approach enables the networks to refine themselves over a period of minutes, hours or even days through occasional model updates.

Figure 4:
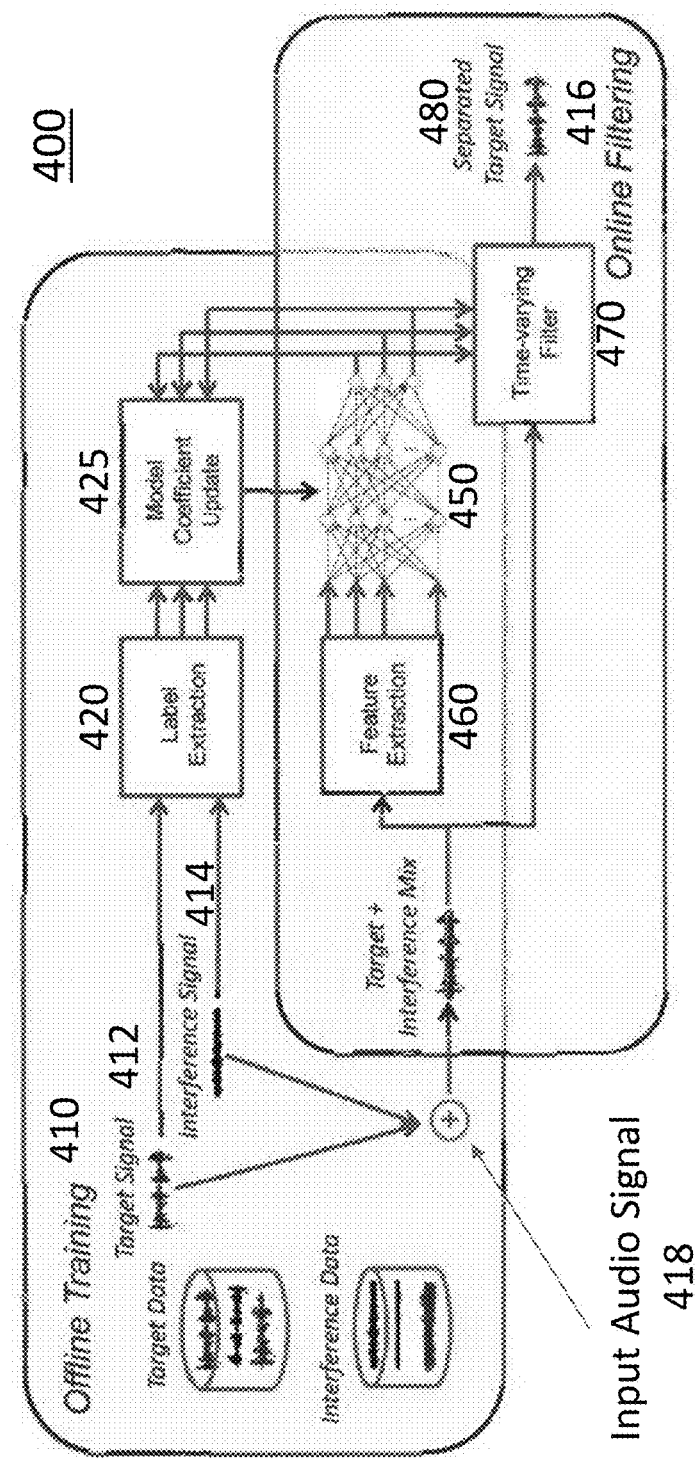
FIG. 4 is a block diagram illustrating example training and filtering processes of a deep neural network of an audio processing system, according to an exemplary embodiment.

For example, FIG. 4 is a block diagram illustrating one possible way of combining offline training and online filtering processes of a deep neural network of an audio separation system, according to some embodiments of the present disclosure. In such embodiments, an offline training stage 410 is used to train the deep neural network 450 as described above. More particularly, the offline training stage 410 involves feeding a training data set including audio signals with known content categories. For example, an audio signal of the training data set may be various combinations of a target signal 412 of a known sound content category (e.g., speech) and one or more interference signals 414 of another known sound content category (e.g., music, ambient sound or noise, etc.).

The combination of the target signal 412 and the interference signal 414 is used to perform a label extraction 420 to obtain the optimal filter for each of the sound content categories of the signals. More particularly, because the "clean" version of the target signal 412 is known, it is very straightforward to compute the optimal filter that can be applied to the combination of the target signal 412 and the interference signal 414 so as to obtain the target signal 412. During the offline training, a model coefficient update process 425 is performed using features extracted from the combination of the target signal 412 and interference signal 414 to update parameters of the deep neural network 450 until the deep neural network 450 is optimized to make predictions consistent with the known content categories. In other words, the optimized deep neural network 450 can be used to produce separated audio signals that are the same as, or close to, the target signal 412 and the one or more interference signals 414 of known sound content categories.

Once the deep neural network 450 is trained, the deep neural network 450 may be downloaded to operate in an online filtering stage 416. As will be described in more detail below, an audio input 418 containing audio signals of various sound categories can be fed to a feature extraction module 460 to generate signal features in the frequency domain (the same signal features that are extracted during off-line training). The deep neural network 450 (trained during the offline process described above) receives the signal features and generates a set of time-varying filters 470 (i.e., frequency masks). The time-varying filters 470 filter the audio signals to generate separated audio signals 480 of various sound content categories, which may include the target signal (e.g., an audio signal of a target sound content category such as speech).

As further shown in FIG. 4, during the online filtering process 416, the filtering results can be fed back into model coefficient update process 425 and used to update the model coefficients used by deep neural network 450. For example, time segments of live audio 418 that contain only one of the pre-defined content categories can be identified in various ways, and these time segments can be used to refine the model coefficients so as to more closely align the deep neural network 450 for the particular online device and/or environment. In a passive approach example, the time segments are identified by comparing the estimated content signals 480 to the input audio mixture 418. When a time segment of an estimated content signal 480 for one of the pre-defined content categories is very close to the audio mixture 418 (e.g., when there is a confidence threshold of, e.g. 95%, or more that the audio mixture 418 contains only sound of one of the pre-defined content categories), it can be assumed that no other audio content is present in that time segment. In other embodiments, a confidence score can be computed based on the computed filters rather than based on the output content. In an active approach example, the time segments are purposely identified, for example by a device user. More particularly, the device user can indicate that an input audio mixture 418 captured by the device during a given time segment only contains sound of a specific sound category (e.g. background noise such as a television playing in the background). This indication can occur either after the time segment has elapsed, or in advance of a time segment (e.g. the user makes the indication, and then uses the device to capture the sound).

These captured time segments of live audio data can then be uploaded back to the offline model training 410 process and added to the content used during offline model training 410. Model coefficients could then be updated in stage 425 of offline training process 410 and then the updated deep neural network 450 can be downloaded back to the online filtering stage 416 to update the coefficients being used by the network 450 of the online system 416. In other embodiments, the deep neural network 450 can be incrementally updated online on the device itself using the captured time segments of live audio data.

Figure 5:
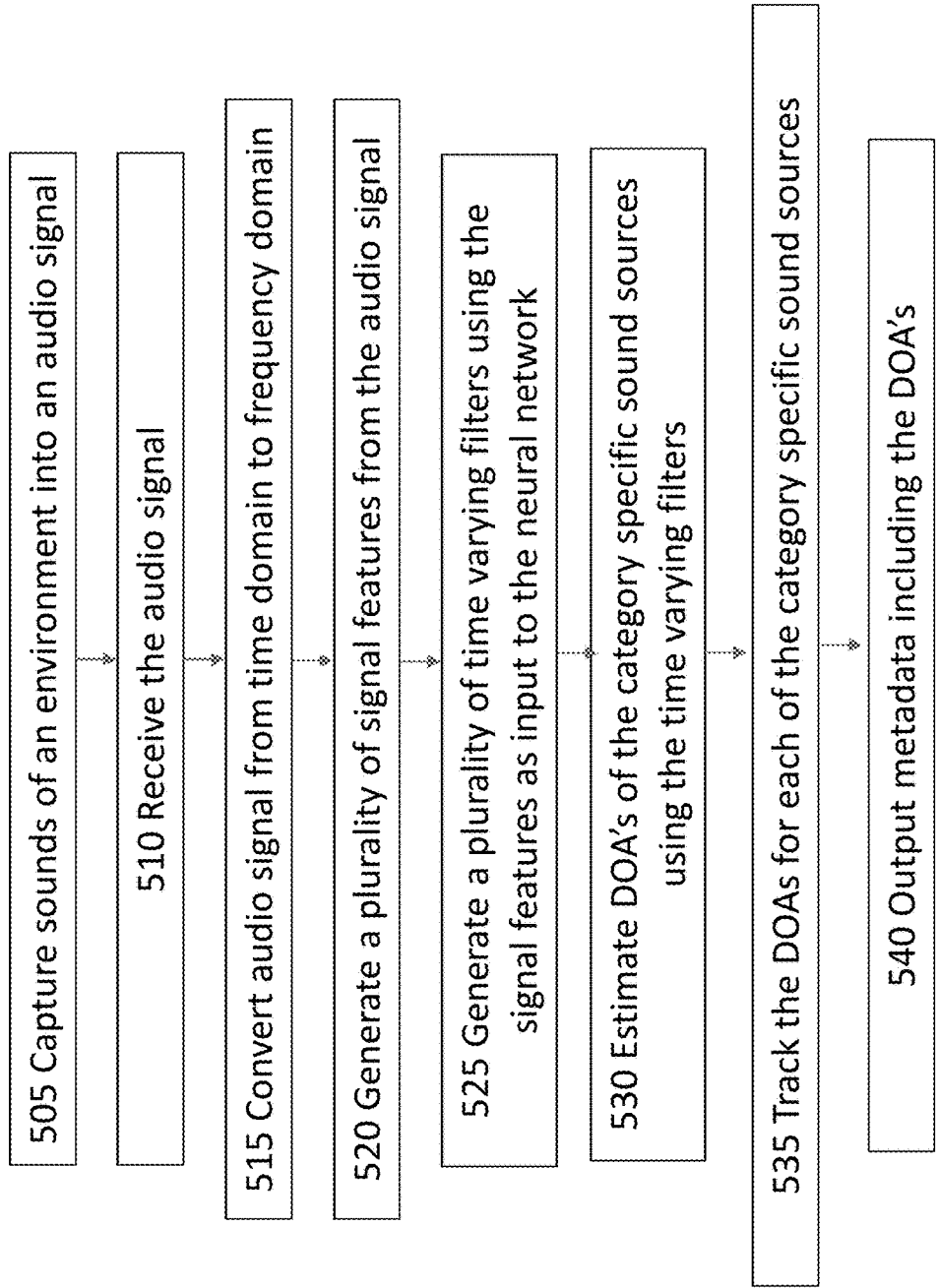
FIG. 5 illustrates a flow chart of an example method of estimating directions of arrival of audio signals using a trained neural network, according to an exemplary embodiment.

Returning to FIG. 2, an example process of estimating and/or tracking DOA's of sound sources, such as described above in connection with step 235, will now be described in more detail, with reference to the flowchart in FIG. 5. In embodiments, this method can be performed using a deep neural network that has been trained as described above. An example process for separating the audio signal into a plurality of content-based (i.e. category specific) signals, such as that described above in connection with step 230, is described in more detail in co-pending U.S. application Ser. No. 09/941,837, the contents of which are incorporated by reference herein in their entirety. As described above, these processes can run concurrently, for example after step 525 is performed as described below.

At step 505, one or more microphones (e.g., a microphone array) capture sounds of an environment into an audio signal. The audio signal includes a combination of category specific audio signals. In some embodiments, the one or more microphones are part of the audio processing system. In some other embodiments, the one or more microphones are external components or devices separate from the audio processing system.

At step 510, the system receives the audio signal. At step 515, the system converts the audio signal from a time domain to a frequency domain. At step 520, a feature extraction module of the audio separation system generates a plurality of signal features from the audio signal. The particular set of signal features that are extracted in this step 520 should be the same set of signal features that are/were used during training of the neural network. The signal features can be extracted from the audio signal in various ways known to those skilled in the art, depending upon the type of signal feature that is extracted. For example, where the audio signal comprises sounds captured by several different microphones, the signal features can include phase differences between sound signals captured by the different microphones, magnitude differences between sound signals captured by the different microphones, respective microphone energies, etc. For individual sound signals from a given microphone, the signal features may include magnitude across a particular spectrum, modulations across a spectrum, frames of magnitude spectra, etc. In these and other embodiments, the signal features may include information representing relationships or correlations between the audio signals of various sound content categories and/or between audio signals from different microphones such as inter-microphone coherence. In some embodiments, the signal features may be represented by, e.g., vectors. In additional or alternative embodiments, some or all of signal features can also be extracted from the time-domain signals (i.e. some portions of step 520 can be performed before step 510).

At step 525, the neural network of the audio processing system generates a plurality of time-varying filters in a frequency domain using the signal features as inputs of the neural network. Each of the time-varying filters corresponds to one of a plurality of sound content categories. In some embodiments, each of the time-varying filters is a time-varying real-valued function of frequency. A value of the real-valued function for a corresponding frequency represents a level of attenuation for the corresponding frequency or range of frequencies. For example, a value of 0.5 for a given frequency or frequency range would cause the signal amplitude for that frequency or frequency range to be reduced by half.

At step 530, the audio processing system estimates DOA's for a plurality of category specific audio signals using the time-varying filters and the neural network. Each of the category specific audio signals contains content of a corresponding sound content category among the plurality of sound content categories.

The result of the above processing performed in an example step 530 according to embodiments yields estimated DOA's for each specific sound category for a current time frame. In a next step 535, the estimated DOA's are used to update a track of the direction of arrival for each of the category specific sound signals across time frames.

Finally, at step 540, the system outputs the above described DOA information as metadata along with each corresponding separated sound signal An example of processing that can be performed to estimate and track DOA's for each category specific sound source according to some embodiments of steps 530 and 535 will now be described in connection with FIG. 6.

As shown, for each time frame and using the neural network and signal features obtained in step 520 for this time frame, a first step 605 includes estimating the probabilities of sound source direction angles. A next step 610 includes mapping the sound source direction angles to the category specific sound sources.

In one embodiment of steps 605 and 610, a detection only approach is used. In this approach, first, for a single source direction angle estimation, a discrete-time Bayesian filter may be used to obtain the posterior probability of direction angle:

$$\underbrace{p(\theta_t | \chi_{1:t})}_{posterior} = \frac{1}{C_\theta} \underbrace{p(\chi_t | \theta_t)}_{likelihood} \underbrace{p^-(\theta_t | \chi_{1:t-1})}_{predictor}$$

$$= \frac{1}{C_\theta} p(\chi_t | \theta_t) \int \underbrace{p(\theta_t | \theta_{t-1})}_{transition} p(\theta_{t-1} | \chi_{1:t-1}) d\theta_{t-1},$$

where θ is an angle of the sound source direction of arrival (DOA), p is the probability function, $C_\theta$ is a normalizing constant to ensure a normalized probability distribution, $\chi^{1:t}$ is the observed signal features from time frame 1 though frame t (e.g. from step 520), where each χ is a single observation (also referred to as detection). In the above equation, the "likelihood" can be obtained from the neural network and the "predictor" is computed recursively. In some embodiments, a first-order Markov system is assumed, i.e. it is assumed that $$p(\chi_t | \theta_t, \chi_{1:t-1}) = p(\chi_t | \theta_t).$$

The single source direction estimation above can be extended to the multi-source direction scenario as follows (where the number of sound source directions is denoted as K and the index of the sound source directions is denoted as k):

$$p(\Theta_t | X_{1:t}) = \frac{1}{C_\Theta} p(X_t | \Theta_t) \int p(\Theta_t | \Theta_{t-1}) p(\Theta_{t-1} | X_{1:t-1}) d\Theta_{t-1}$$

where $X_t$ denotes a set of observations in frame t, and $\Theta_t$ denotes a set of angles of DOAs in frame t.

The estimated probabilities of DOA's obtained above are then mapped to the individual sound source categories. First, let $X_t = \{\chi_{1,t}, \ldots, \chi_{i,t}, \ldots, \chi_{I,t}\}$ denote the set of I observations in frame t. In the detect only embodiments, a data association hypothesis is defined as:

$$A_t = \{\alpha_{1,t}, \ldots, \alpha_{i,t}, \ldots, \alpha_{I,t}\}, \alpha_{i,t}: \chi_{i,t} \mapsto \{0, \ldots, K\},$$

where $\alpha_{i,t}$ is a mapping from a detection $\chi_{i,t} \in X_t$ to an individual sound source k.

Introducing A as an unknown variable, the DOA estimation problem is then:

$$p(\Theta_t, A_{1:t} | X_{1:t}) = p(\Theta_t | A_{1:t}, X_{1:t}) p(A_{1:t} | X_{1:t}),$$

$$= \left( \prod_k p(\theta_{k,t} | X_{k,1:t}^A) \right) p(A_{1:t} | X_{1:t}),$$

wherein $X_{k,t}^A$ denotes data assigned to source k by the mapping of $A_t$.

As observations in an overall tracking process, the processing of detect only embodiments of steps 605 and 610 described above may detect a set of directions in each time frame, $X_t$.

In other embodiments describe in more detail below, embodiments of steps 605 and 610 use a "track before detect" approach that utilizes the observed correlations across the audio signals in all frequency bands of the category specific audio signal. Let, $$\Theta_t^s = \underset{\Theta_t}{\mathrm{argmax}} [\log p(Z_t | \Theta_t, \hat{g}_t)].$$

where argmax[ ] is the function of arguments of the maxima, $Z_t$ denotes a set of input features for a time frame t, $\hat{g}_t$ denotes the time-varying filter for the specific audio content category generated by the neural network in step 525 based on the input features for the time frame t.

Then let, $$\log p(Z_t | \Theta_t = \{\theta\}, \hat{g}_t) \approx \gamma_1 \frac{\sum_c w_{c,t} \log p_{c,t}(z_{c,t} | \theta)}{\sum_c w_{c,t}},$$

$$\log p(Z_t | \Theta_t = \{\theta_1, \theta_2\}, \hat{g}_t) \approx \gamma_2 \frac{\sum_c w_{c,t} \log \max \left[ \begin{array}{c} p_{c,t}(z_{c,t} | \theta_1) \\ p_{c,t}(z_{c,t} | \theta_2) \end{array} \right]}{\sum_c w_{c,t}},$$

wherein $\gamma_2 < \gamma_1$ are tuning parameters that are tuned such that two directions are detected in each frame, $p_{c,t}(z_{c,t} | \theta)$ denotes the DOA probability for a single source direction, c denotes the index of the frequency bands (also referred to as frequency bins or frequency channels), $z_{c,t}$ denotes the observed data of frequency band c at time frame t, the and $\omega_{c,t} = \hat{g}_{c,t} \phi_{dd}(c)$ is a real-valued weight to focus across-frequency integration on the frequency bands with significant target energy. This approach can be easily extended to detect more than two directions each frame.

The result of the above processing performed according to both "detect only" and "track before detect" embodiments of steps 605 and 610 yields an updated set of estimated DOA's for each specific sound category for this time frame in step 615.

Figure 6:
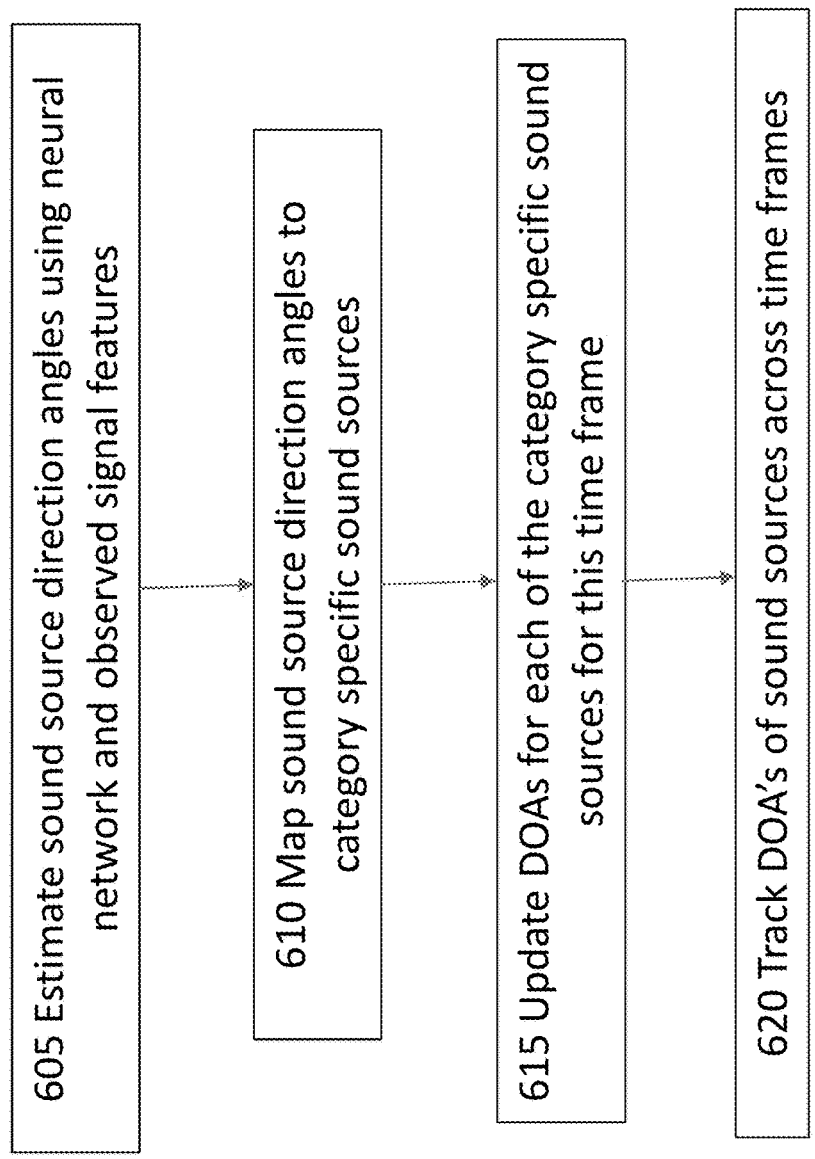
FIG. 6 is a flow chart further illustrating example processing that can be performed to estimate and track directions of arrival according to an exemplary embodiment.

As shown in FIG. 6, in a next step 620, given the target direction detection across the time frames, $X_{1:t}^s$, embodiments may further track K (e.g., 1, 2, 3, etc.) dominant target directions of arrival as $$p(\Theta_t^s, A_{1:t} | X_{1:t}^s) = \left( \prod_k p(\theta_{k,t}^s | X_{k,1:t}^A) \right) p(A_{1:t} | X_{1:t}^s),$$

Embodiments use a Kalman filter to implement the following:

$$p(\theta_{k,t}^s | \chi_{k,1:t}^\alpha) \approx \frac{1}{C_\theta} p(\chi_{k,t}^\alpha | \theta_{k,t}^s) \int p(\theta_{k,t}^s | \theta_{k,t-1}^s) p(\theta_{k,t-1}^s | \chi_{k,1:t-1}^\alpha) d\theta_{k,t-1}^s.$$

It is also necessary to compute the probability of the data association hypotheses, $$p(A_{1:t} | X_{1:t}) = p(A_t | A_{1:t-1}, X_{1:t})$$

For each category specific audio signal, embodiments of step 620 may compute K source directions of arrival as, $$\hat{\Theta}_t^s = \underset{\Theta_t}{\operatorname{argmax}}[p(\Theta_t \mid A_{1:t}, X_{1:t}^s)p(A_{1:t} \mid X_{1:t}^s)].$$

Figure 7:
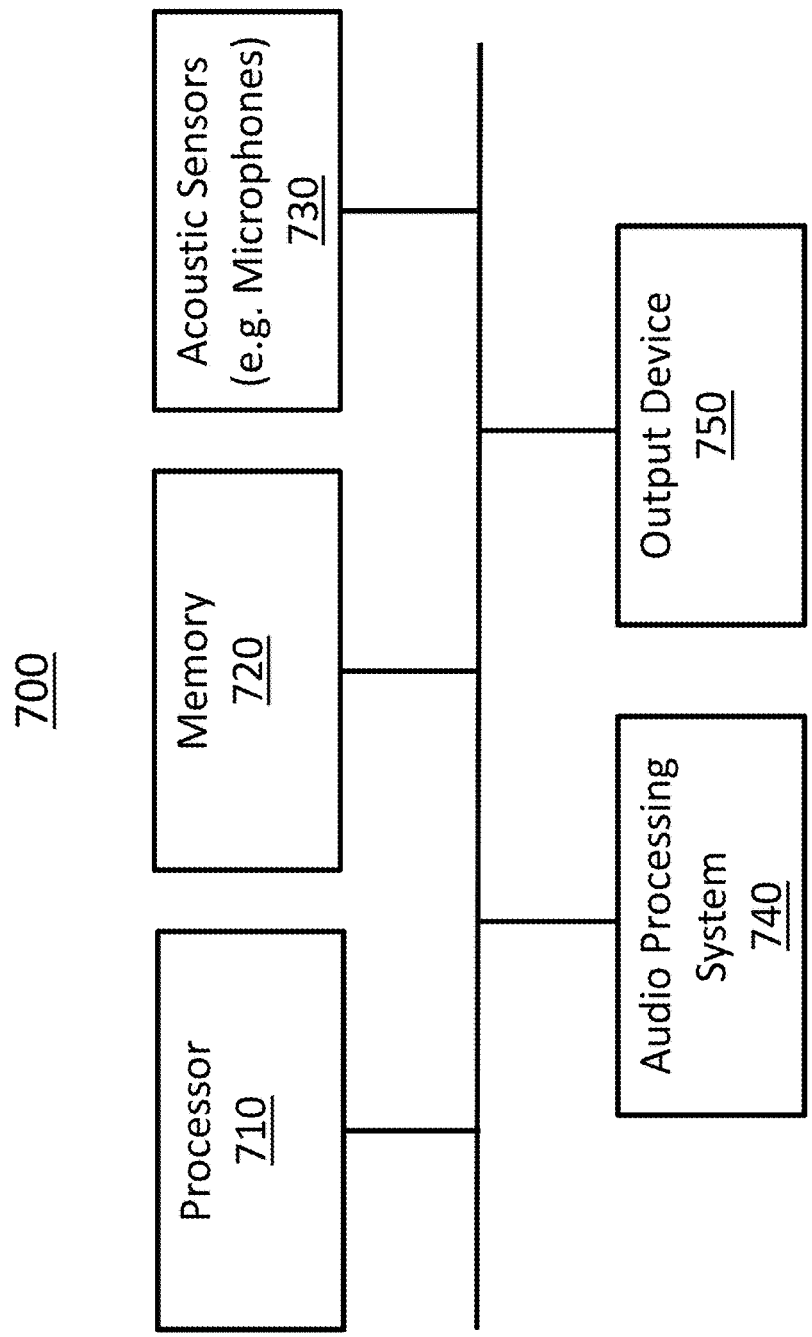
FIG. 7 is a block diagram illustrating components of an audio processing system, according to an exemplary embodiment.

FIG. 7 is a block diagram illustrating components of an example audio processing system 700, according to some embodiments of the present disclosure. As illustrated in FIG. 7, the audio processing system 700 may include a processor 710, a memory 720, one or more acoustic sensors 730, an audio processing system 740, and an output device 750. In some other embodiments, the system 700 may include more or other components to provide a particular operation or functionality. Similarly, in some other embodiments, the system 700 includes fewer components that perform similar or equivalent functions to those depicted in FIG. 7.

The processor 710 may include hardware and software that implement the processing of audio data and various other operations depending on a type of the system 700. For example, at least some components of the system 700 may be a part of a communication device (e.g., a mobile phone) or a computing device (e.g., a computer). Memory 720 (for example, non-transitory computer readable storage medium) stores, at least in part, instructions and data for execution by processor 710 and/or the audio processing system 740.

The audio processing system 740 may be configured to receive acoustic signals representing at least one sound captured by the one or more acoustic sensors 730 and process the acoustic signal components such as performing audio separation based on content categories and associated DOA estimation and tracking. The acoustic sensors 730 may be, e.g., microphones. Although various examples are described in regard to the acoustic sensor(s) 730 being one or more microphones 730, other suitable acoustic sensors may be used. In some embodiments, an array of two or more acoustic sensors (e.g., microphones) 730 are spaced at a spatial pattern such that the acoustic waves impinging on the device from certain directions and at different phases exhibit different energy levels at the array of two or more acoustic sensors. After reception by the acoustic sensors (e.g., a microphone array) 730, the acoustic signals can be converted into electric signals. These electric signals can, in turn, be converted by an analog-to-digital converter into digital signals for processing in accordance with some embodiments described herein. In some embodiments, the electric signals from the acoustic sensors 730 are digital signals. In still further embodiments, the microphones may be placed in different locations pointing to different directions in an environment.

The output device 760 is a device that provides audio output (e.g. one or more separated sound signals) to an external device. For example, the output device 760 may include a network interface or other data communications interface. In some embodiments, the audio output may be stored in memory 720 before being provided to an external device.

Figure 8:
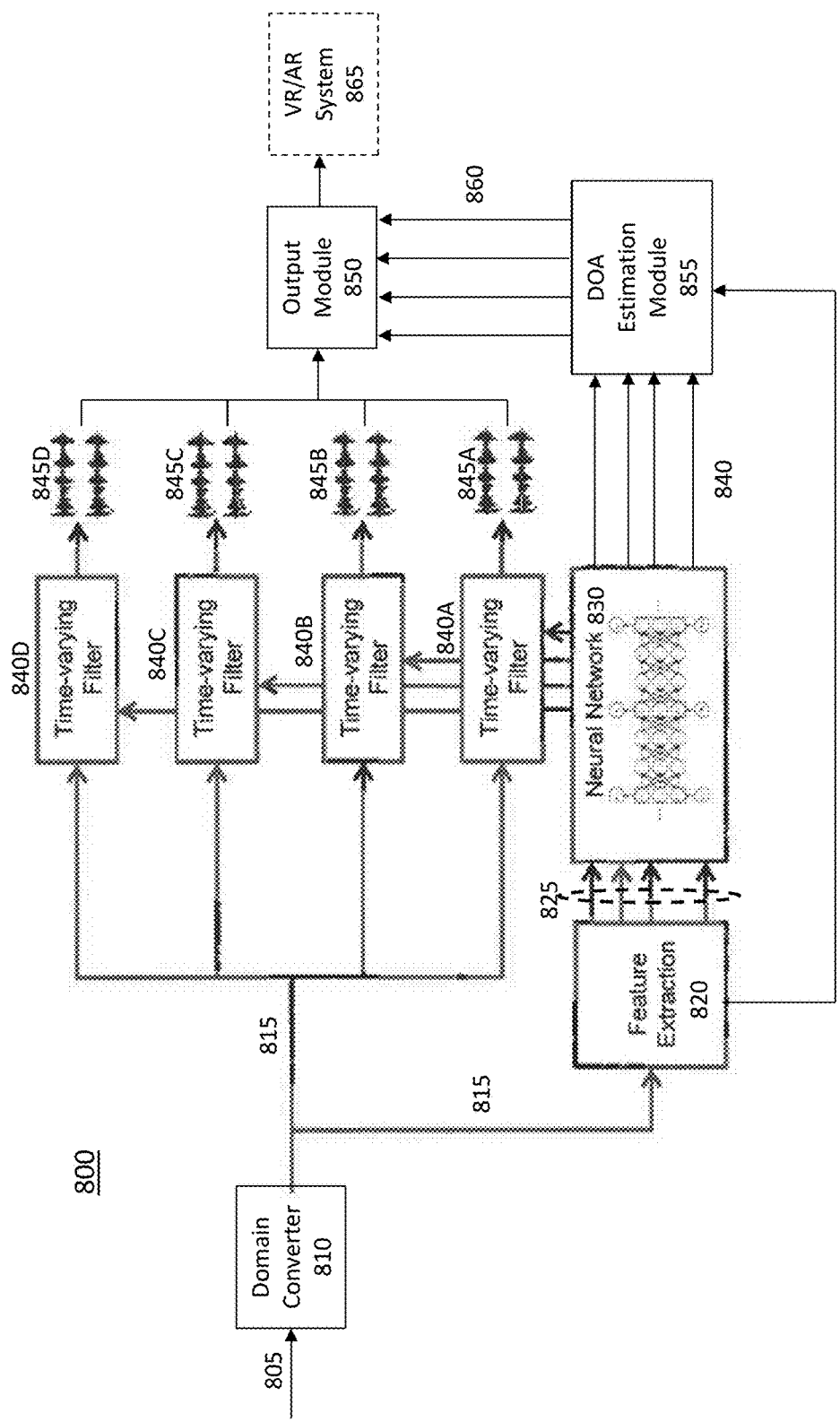
FIG. 8 is a block diagram illustrating an apparatus for estimating directions of arrival in an audio processing system having a trained neural network, according to an exemplary embodiment.

FIG. 8 is a block diagram illustrating an audio processing system of an audio processing system, which can be used to implement part or all of audio processing system 740 according to some embodiments of the present disclosure. The audio processing system 800 in these embodiments includes a domain converter 810, a feature extraction module 820, a neural network 830, one or more time-frequency masks 840A-840D, a DOA estimation module 855 and an output module 850.

Notably, in embodiments, neural network 830 is a deep neural network that has been trained for specific sound categories, for example using the methodologies described above in connection with FIGS. 3 and 4.

In some embodiments, the domain converter 810 receives at least one input audio signal 805 presented in the time domain. The input audio signal 805 includes a combination of sound signals of different content categories. For example, the input audio signal 805 may include a combination of speech, music, and/or ambient sound. In some other embodiments, the input may include multiple audio signals. For example, the input may include multiple audio signals captured by the microphones of the array.

In some embodiments, the input audio signal 805 is comprised of, or is converted into, frames containing audio for a certain amount of time. In these and other embodiments, for each time frame, the domain converter 810 converts the input audio signal 805 from the time domain to a frequency domain. In some embodiments, the conversion may be performed using, e.g., an auditory filterbank, FFT, or STFT. Each time frame of the converted audio signal 815 presented in the frequency domain is fed to the feature extraction module 820. The domain converter 810 may continuously process the input audio signal 805 for each time frame and continuously feeds the converted signal 815 for each time frame to the feature extraction module 820.

In the illustrated embodiment, the feature extraction module 820 extracts signal features 825 in the frequency domain representation of signal 815. The feature extraction module 820 further feeds the signal features 825 to the neural network 830. The signal features 825 may include information such as that described above in connection with FIG. 5. In additional or alternative embodiments, some or all of signal features 725 can also be captured from the time-domain signals.

In some embodiments, for each time frame, the neural network 830 receives a new set of signal features 825 as input and may run in real time as the audio processing system 800 continuously receives the input audio signal 805. In real time, using the set of signal features 825 as input, the neural network 830 generates a set of time-varying filters 840A, 840B, 840C, and 840D for the specific time frame. Each filter corresponds to a pre-defined sound content category. As should be apparent, the filters of the sound content categories can be different from each other, and so each sound content category at a specific time frame has its own unique filter. The term "time-varying filter" refers to the fact that a filter for a given one of the sound categories for a first time frame may be different than the filter for the given sound category in a second time frame based on changing signal features 825 over time.

The domain converter 810 sends the converted audio signal 815 in the frequency domain for a specific time frame to the filters 840A-840D generated for the same specific time frame. Each of the filters 840A-840D filters the converted audio signal 815 into a separated audio signal 845A, 845B, 845C, or 840D. Each of the separated audio signals 845A, 845B, 845C, or 840D includes an audio signal of a corresponding sound content category.

More particularly, in some embodiments, each of the filters 840A-840D is a real-valued (or alternatively, complex-valued) function (also referred to as masking function) of frequency for a specific time frame, where each frequency bin (e.g., a frequency range) has a value from 0 to 1. Thus, each of the filters 840A-840D filters the converted audio signal 815 in the frequency domain by multiplying the converted audio signal 815 by the masking function. A portion of the audio signal is attenuated at frequency points where the value of the masking function is less than 1. For example, a value of zero of the masking function mutes a portion of the audio signal at a corresponding frequency point. In other words, sound in frequency points where the masking function is equal to 0 is inaudible in a reconstructed output signal filtered by the masking function.

In some embodiments, the output module 850 receives the separated audio signals 845A, 845B, 845C, and 845D for the corresponding sound content categories and may convert the separated audio signals 845A, 845B, 845C, and 845D from the frequency domain back to the time domain. In some embodiments, the output module 850 may output the separated audio signals 845A, 845B, 845C, and 845D to other systems or modules for further processing depending on the applications. In some embodiments, prior to signal outputting, the output module 850 may combine the separated audio signals 845A, 845B, 845C, and 845D into one or more combined audio signals. For example, each combined audio signal may include one or more channels, each channel corresponding to a different sound content category. In some embodiments, the number of separated audio signals (and the number of filters) may vary according to various embodiments.

The audio signals separated based on sound content categories (either as separate audio signal streams or channels of an audio signal stream) may be used for various applications such as reproducing a sound environment in VR or AR applications. For example, as shown in FIG. 8, output module 850 may output the separated audio signals to a VR reproduction system including a VR audio rendering system 865. The VR reproduction system in this example is external to the audio processing system 800. In other embodiments, the VR reproduction system may be included in a same system with the audio processing system 800, in which case output module 850 may not be needed.

In these and other embodiments, the output module 850 may output the separated audio signals 845A, 845B, 845C, and 845D along with metadata 860. In such embodiments, metadata 860 includes estimated DOA information for each of the separated audio signals that is output by a DOA estimation module 855. DOA estimation module 855 can generate this DOA information using extracted signal features and the time varying filters generated by the neural network 830 using the processing described above in connection with FIGS. 5 and 6, for example.

The VR audio rendering system 865 receives the separated audio signals 845A, 845B, 845C, and 845D and the metadata 860 (e.g., DOA information of sound sources) and performs further audio processing for VR rendering. For example, the VR audio rendering system 865 may mix and/or playback one or more of the separated audio signals 845A, 845B, 845C, and 845D based on the spatial information of sound sources, such that the VR audio rendering system 865 recreates a sound environment (also referred to as sound stage) that is the same as, or similar to, the actual sound environment including the original sound sources. For example, the VR audio rendering system 865 may be included in an overall virtual reality system that displays both video and audio. In an example where one of the audio signals 845 is associated with human speech, the overall system may display an avatar or animated person in a virtual environment or virtual world, and the audio signal 845 may be rendered so as to originate from the mouth of the avatar or animated person, with the display including the mouth moving in accordance with the rendered audio. If another of the audio signals 845 is associated with music, for example, the video and audio display may further include a band, with the sound originating from the band. Using the spatial information of the sound source of 845 (e.g. a person speaking), AR audio rendering system 865 may further dynamically adjust the mixing and playback of the audio signals, for example depending on a position and an orientation of a head of the user wearing a VR headset.

As used herein, the singular terms "a," "an," and "the" may include plural references unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method for estimating directions of arrival based on categories, comprising:
    receiving an audio signal;
    providing the audio signal to a neural network that has been trained using known sound content corresponding to the plurality of sound content categories;
    generating, by the neural network, a plurality of filters based on the audio signal, each of the filters corresponding to one of the plurality of sound content categories; and
    separating the audio signal into a plurality of category specific audio signals using the filters, the category specific audio signals respectively corresponding to the plurality of sound content categories; and
    for each of the category specific audio signals, generating a direction of arrival (DOA) for a sound source of the category specific audio signal.

2. The method of claim 1, wherein generating the DOA further includes, for each of the category specific audio signals, generating a probability value indicating a likelihood of the DOA of the sound source.

3. The method of claim 2, further comprising extracting a plurality of features from the audio signal, wherein generating the DOA for the sound source and the probability value is further based on the extracted features.

4. The method of claim 1, wherein generating the DOA comprises:
extracting a plurality of features from the audio signal;
generating one or more estimated DOAs for one or more sound source directions and probabilities associated with the estimated DOAs based on the extracted features; and
selecting the DOA from the one or more estimated DOAs by comparing the probabilities associated with the estimated DOAs.

5. The method of claim 1, further comprising:
tracking the DOA of the sound source of the category specific audio signal across multiple time frames.

6. The method of claim 5, wherein the DOA of the sound source of the category specific audio signal is tracked using a Kalman filter.

7. The method of claim 1, wherein the method further comprises generating a plurality of features from the audio signal, and wherein generating the plurality of filters is further based on the generated features.

8. The method of claim 1, further comprising converting the audio signal from a time domain to a frequency domain, wherein the plurality of filters comprise frequency domain filters, and wherein the plurality of filters are applied to the frequency domain representation of the audio signal.

9. The method of claim 8, further comprising converting the plurality of category specific audio signals from the frequency domain into the time domain.

10. The method of claim 1, wherein the neural network has been trained by:
combining at least a first training signal of a first known sound content category and a second training signal of a second known sound content category into a combined training audio signal; and
training the neural network by feeding the combined training audio signal into the neural network and optimizing parameters of the neural network.

11. The method of claim 10, wherein optimizing parameters of the neural network includes comparing a frequency mask generated by the neural network to an optimal frequency mask associated with one of the first and second audio signals.

12. The method of claim 10, wherein the first and second training signals are clean signals having sound content corresponding the first and second known sound content categories, respectively.

13. The method of claim 1, wherein each of the filters is a time-varying real-valued function of frequency, and a value of the time-varying real-valued function for a corresponding frequency and a corresponding time frame represents a level of signal attenuation for the corresponding frequency at the corresponding time frame.

14. The method of claim 13, wherein the separating the audio signal into a plurality of category specific audio signals by applying the filters to the audio signal comprises:
separating the audio signal into a plurality of category-specific audio signals by multiplying the audio signal by the time-varying real-valued functions.

15. The method of claim 1, further comprising:
reproducing a virtual reality sound stage using the category specific audio signals and the DOAs of the sound sources.

16. A method of reproducing a virtual sound environment, comprising:
receiving an audio signal;
generating a plurality of filters based on the audio signal, each of the filters corresponding to one of a plurality of sound content categories, the sound content categories including a target sound content category and one or more ambient sound content categories; and
separating the audio signal into a plurality of category specific audio signals using the filters, the category specific audio signals includes a target category specific audio signal of the target sound content category and one or more ambient category specific audio signals of the ambient sound content categories;
for each of the category specific audio signals, generating a direction of arrival (DOA) for a sound source of the category specific audio signal and a probability value indicating a likelihood of the DOA of the sound source; and
reproducing a virtual sound environment by replaying the category specific audio signals using a plurality of speakers, wherein for each of the category specific audio signals, designation of one or more of the speakers that replay the category specific audio signal and determination of replay parameters are based on the DOA of the sound source of the category specific audio signal.

17. The method of claim 16, wherein generating the plurality of filters is performed using a neural network that has been trained using known sound content corresponding to the plurality of sound content categories.

18. The method of claim 17, wherein the neural network has been trained by:
combining a first training signal of the target sound content category and a second training signal of one of the ambient sound content categories into a combined training audio signal; and
training the neural network by feeding the combined training audio signal into the neural network and optimizing parameters of the neural network.

19. The method of claim 18, wherein optimizing parameters of the neural network includes comparing a frequency mask generated by the neural network to an optimal frequency mask associated with one of the first and second training signals.

20. The method of claim 18, wherein the first and second training signals are clean signals having sound content corresponding to the first and second known sound content categories, respectively.

* * * * *